United States Patent [19]

Neula

[11] 4,273,292
[45] Jun. 16, 1981

[54] SELF-CLOSING SHOWER HEAD

[76] Inventor: Allen Neula, 27486 Verona Ave., Hayward, Calif. 94545

[21] Appl. No.: 143,082

[22] Filed: Apr. 23, 1980

[51] Int. Cl.³ .......................... F16K 31/143; B05B 1/02
[52] U.S. Cl. .................................. 239/562; 239/574; 239/577; 251/40
[58] Field of Search ....................... 251/38, 39, 40, 41, 251/42, 43, 44; 239/574, 577, 579, 583, 444, 570, 562

[56] References Cited

U.S. PATENT DOCUMENTS

| | | | |
|---|---|---|---|
| 2,130,611 | 9/1938 | Burdick | 251/38 |
| 2,145,772 | 1/1939 | Metzger | 251/38 |
| 2,559,894 | 7/1951 | Nordell | 239/562 |
| 3,291,439 | 12/1966 | Goldstein | 251/42 |

FOREIGN PATENT DOCUMENTS 544918  5/1942  United Kingdom ...................... 251/40

Primary Examiner—Martin P. Schwadron
Assistant Examiner—G. L. Walton

[57] ABSTRACT

This shower head is designed to allow hot and cold water to shut off completely, when persons are soaping themselves, or when not in use, and it consists primarily of a main body, in which water flows into a channel, and proceeds into a minimum metering channel, that is designed to allow the minimum flow needed to operate the device. It further includes a plunger, which is compressed by water pressure in an upper chamber, so as to move it down to the closed position, and a manually operated release mechanism will tilt a valve, which will release the water pressure in the upper chamber, and cause it to flow out of the sprayer plate of the device.

1 Claim, 7 Drawing Figures

SELF-CLOSING SHOWER HEAD

This invention relates to water control devices, and more particularly, to a self-closing shower head.

It is the principal object of this invention to provide a self-closing shower head, which will be unique, in that it will shut off completely, when the user is soaping himself.

Another object of this invention is to provide a self-closing shower head, which will employ a minimum metering channel, for the minimum flow of water needed to operate the unit, and water pressure, in an upper chamber of the unit, will compress a plunger, that will move down to the closed position, for ceasing water flow.

Another object of this invention is to provide a self-closing shower head, which will employ a manually depressible button type release mechanism, for tilting a valve, to release water under pressure from the upper chamber, so as to enable the water to flow from the sprayer plate portion of the unit.

A further object of this invention is to provide a self-closing shower head, which will substantially aid in the conservation of water.

Other objects are to provide a self-closing shower head, which is simple in design, inexpensive to manufacture, rugged in construction, easy to use, and efficient in operation.

These, and other objects, will be readily evident, upon a study of the following specification, and the accompanying drawing, wherein.

Figure 1:
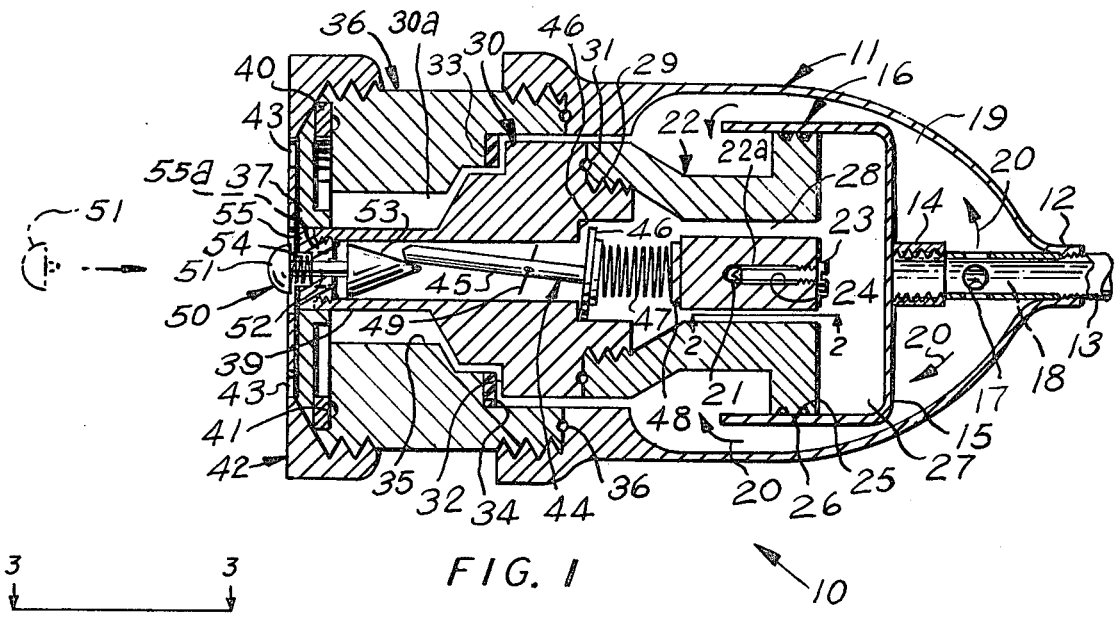
FIG. 1 is a side view of the present invention, shown in elevation and in section.
Figures 2, 3:
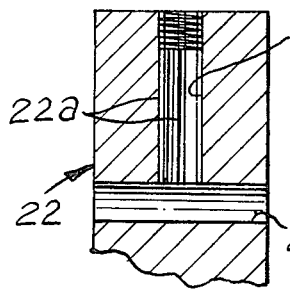
FIG. 2 is an enlarged cross-sectional view, taken along the line 2—2 of FIG. 1.
FIG. 3 is a view taken along the line 3—3 of FIG. 2.
Figure 4:
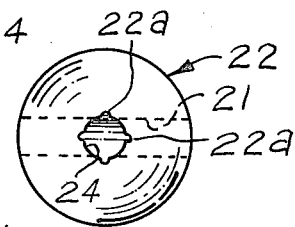
FIG. 4 is an enlarged end view of the screw plug of the tilt valve release mechanism, shown in elevation, and removed from FIG. 1.
Figure 5:
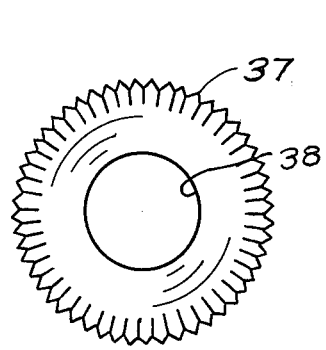
FIG. 5 is a plan view of the spacer, shown removed from the water sprayer cap of FIG. 1.
Figure 6:
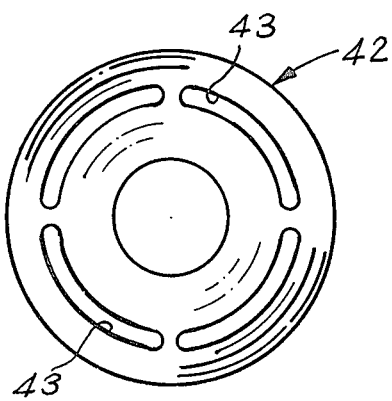
FIG. 6 is a plan view of the water sprayer cap, shown removed from FIG. 1.
Figure 7:
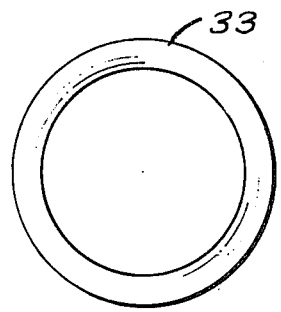
FIG. 7 is a plan view of the rubber seal, shown removed from FIG. 1.

According to this invention, a shower head 10 is shown to include a main body 11, having a neck 12, which is threadingly received on pipe 13. Pipe 13 is threaded into neck 14 of the end wall 15 of cylinder 16. A pair of transverse openings 17, through pipe 13, enables water 18 to enter chamber 19, as is indicated by the arrows 20. Water 18 then proceeds into transverse opening 21 of plunger body 22.

It shall be noted, that an adjustment needle valve 23, threadingly received in opening 24 of plunger body 22, provides a means of adjusting the water 18 flow timing sequence, by restricting or releasing full water 18 flow in opening 21 of plunger body 22, and a plurality of equally spaced-apart slots 22a, in opening 24, enables water to flow into cylinder 16.

Plunger body 22 includes a pair of rubber sealing rings 25, on its outer periphery 26, for water-sealing it within cylinder 16, and water 18 is received in the chamber 27 of cylinder 16, by means of two passageways 28. The plunger body 22 is threaded onto the neck 29 of plunger base member 30, and a rubber sealing ring 31 is received between the end of plunger body 22 and the plunger base member 30. A shoulder 32, of base member 30, is removably received against a rubber gasket 33 upon seat 34, within the bore 35 of sleeve 36, so as to shut the water 18 flow on and off. A finned plate 37 is received, by its opening 38, on the hollow stem 39 of base member 30, and a spacer 40 is received against a sealing ring 41, on the open end of base member 30. A sprayer cap 42 is threaded onto the open end of base member 30, and includes a plurality of openings 43 for water 18 to be expelled therefrom.

A tilt valve 44, within the stem 39 of base member 30, includes a solid stem 45, fixedly secured to a disc 46, which is attached to one end of a coil spring 47, and the opposite end of spring 47 abuts with wall 48 of plunger body 30. Tilt valve 44 further includes a pin 49, transversely therethrough, for providing leverage means, to ease the pressure on the release mechanism 50.

It shall also be noted, that disc 46, of stem 45, is normally urged against seat 46a in base member 30, and water 18 flows in passageways 30a and through stem 39, at different periods in the cycle of operation.

Release mechanism 50 includes, further, a button 51 fixedly secured to a shaft 52, the end of which is terminated by a conical head 53, that is engagable with the end of stem 45. A coil spring 54, on shaft 52, is received in screw plug 55 of stem 49, so as to provide return means for button 51 and disc 46 of release mechanism 50.

After water 18 is discharged from pipe 13, it enters into the minimum metering channel 19, which is designed to enable the minimum of water 18 flow, that is needed to operate shower head 10. The water 18, in this area, is used to open and close head 10. When the water 18, under pressure, enters opening 21, it flows into the chamber 27, by means of fluted openings 24, and needle valve 23 is the means for adjusting the closing sequence. The water 18 pressure, in the chamber 27, compresses the plunger body 22, and forces it to move down to the closed position upon seat 34. By depressing button 51 of the release mechanism 50, the tilting of this tilt valve 44 releases the water 18 pressure from the chamber 27, which moves the plunger body 22 to the open position, and enables the water 18 to flow out of the openings 55a and the openings 43 of the spray cap 42, and thus the cycle is completed.

While various changes may be made in the detail construction, it is understood that such changes will be within the spirit and scope of the present invention, as is defined by the appended claims.

What I now claim is:

1. A self-closing shower head, comprising, in combination, a hollow main body, a hollow cylinder secured in said hollow main body, a plunger slidably received in said hollow main body, for using water pressure in said hollow cylinder to advance said plunger onto a seat in a sleeve secured in said hollow main body, an externally threaded inlet water pipe threaded into a neck portion integral of the end wall of said hollow cylinder, said inlet water pipe being threadingly received in the neck portion of said hollow main body, and a pair of transverse openings through said water pipe enables water to flow into said hollow main body around the outer periphery of said hollow cylinder and the outer periphery of a portion of said plunger, and a transverse opening through said plunger receives the water, and the flow is metered by an adjustable needle valve threadingly received in a fluted opening included on the longitudinal axis of said plunger, and said needle valve intersects with the transverse opening through said plunger, for adjustably restricting the water flow.

* * * * *